United States Patent
Sugibayashi

(10) Patent No.: US 7,823,450 B2
(45) Date of Patent: Nov. 2, 2010

(54) ANGULAR VELOCITY SENSOR AND METHOD OF SETTING TEMPERATURE CHARACTERISTICS OF ANGULAR VELOCITY SENSOR

(75) Inventor: Hideaki Sugibayashi, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 33 days.

(21) Appl. No.: 12/255,778

(22) Filed: Oct. 22, 2008

(65) Prior Publication Data

US 2009/0031804 A1 Feb. 5, 2009

Related U.S. Application Data

(63) Continuation of application No. PCT/JP2007/056352, filed on Mar. 27, 2007.

(30) Foreign Application Priority Data

Apr. 26, 2006 (JP) ............................. 2006-122284

(51) Int. Cl.
G01P 9/04 (2006.01)
G01C 19/56 (2006.01)
(52) U.S. Cl. ................................. 73/504.12; 73/504.16
(58) Field of Classification Search ............... 73/504.12, 73/504.14, 504.15, 504.16
See application file for complete search history.

(56) References Cited

U.S. PATENT DOCUMENTS 5,794,080 A * 8/1998 Watanabe et al. ........ 73/504.12

FOREIGN PATENT DOCUMENTS

| JP | 07-128074 A | 5/1995 |
| JP | 11-344344 A | 12/1999 |
| JP | 2002-107148 A | 4/2002 |
| JP | 2005-274537 A | 10/2005 |

OTHER PUBLICATIONS

Official Communication issued in International Patent Application No. PCT/JP2007/056352, mailed on Jun. 19, 2007.

* cited by examiner

*Primary Examiner*—John E Chapman
(74) *Attorney, Agent, or Firm*—Keating & Bennett, LLP

(57) ABSTRACT

In a method of setting temperature characteristics of an angular velocity sensor, temperature characteristics of a detuning frequency are acquired. The detuning frequency is a frequency difference between an oscillation frequency of an oscillation circuit including a piezoelectric vibrator and a frequency of a voltage of the piezoelectric vibrator caused by the Coriolis force. The sensitivity to the detuning frequency is acquired. The temperature characteristics of a detection phase are acquired. The detection phase is a phase difference between a Coriolis signal phase that corresponds to a phase angle of a voltage signal and an oscillation signal phase of the oscillation circuit. The sensitivity to the detection phase is acquired. The amount of phase shift of the detection phase is determined so that the change in sensitivity caused by the change in the detuning frequency with temperature is controlled using the change in sensitivity caused by the change in the detection phase with temperature.

2 Claims, 10 Drawing Sheets

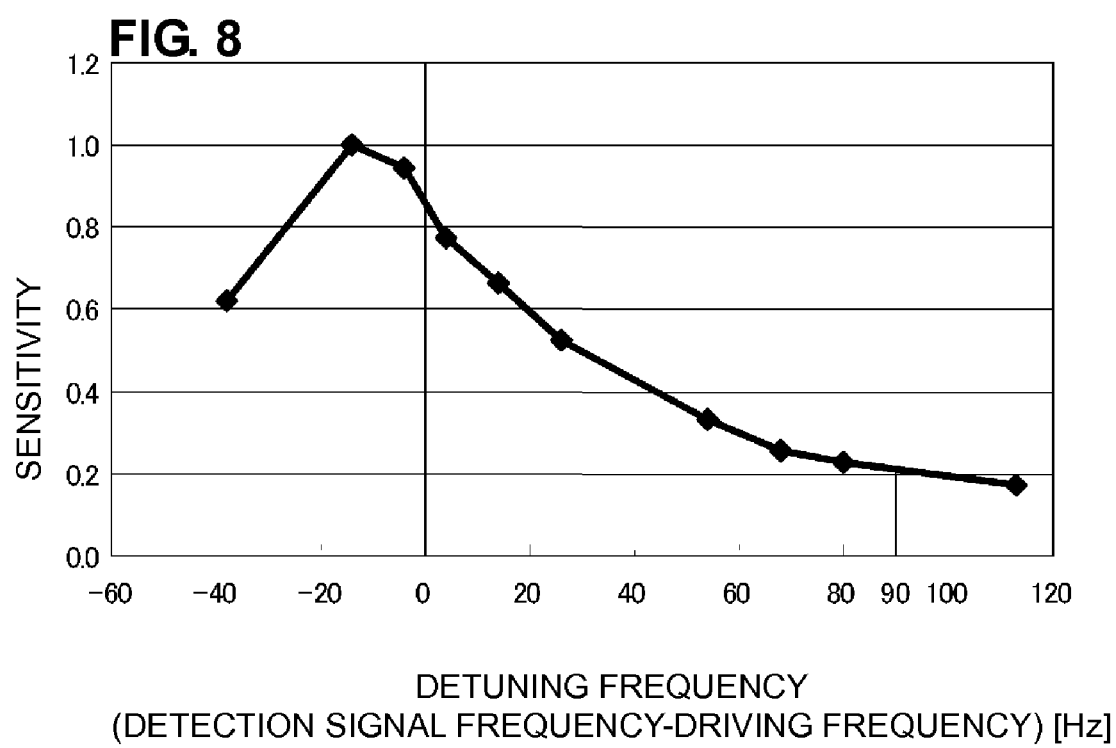

FIG. 13A

DETECTION SIGNAL

REFERENCE VOLTAGE

FIG. 13B

DETECTION SIGNAL

CORIOLIS FORCE (DIFFERENTIAL OUTPUT)

REFERENCE VOLTAGE

FIG. 13C

DETECTION SIGNAL

REFERENCE VOLTAGE

ANGULAR VELOCITY SENSOR AND METHOD OF SETTING TEMPERATURE CHARACTERISTICS OF ANGULAR VELOCITY SENSOR

BACKGROUND OF THE INVENTION

1. Field of the Invention

The present invention relates to an angular velocity sensor used to correct camera shake and a method of setting temperature characteristics of the angular velocity sensor.

2. Description of the Related Art

In digital still cameras and digital video cameras, an angular velocity sensor arranged to detect camera shake is used to correct camera shake. Such an angular velocity sensor is driven by an oscillation circuit including a piezoelectric vibrator, detects a voltage caused by the vibrations of the piezoelectric vibrator that occur due to the Coriolis force, and outputs a voltage signal based on an angular velocity. The differential amplification of the voltage of the piezoelectric vibrator is performed. The synchronous detection of the differential amplification result is performed in synchronization with a driving signal driving the piezoelectric vibrator. The synchronous detection result is converted into a direct voltage signal. Direct-current amplification of the direct voltage signal is performed.

As the difference between the frequency of the voltage signal of the piezoelectric vibrator and the oscillation frequency of the oscillation circuit (hereinafter referred to as a "detuning frequency") decreases, the detection sensitivity of an angular velocity increases. Since the detuning frequency has temperature characteristics, the detection sensitivity of an angular velocity changes in accordance with the temperature.

However, when the sensitivity of an angular velocity sensor changes in accordance with the temperature, even if the angular velocity sensor detects the same angular velocity, the detection result varies in accordance with the temperature. Accordingly, in known angular velocity sensors, sensitivity correction is performed so that the detection sensitivity of an angular velocity falls within a predetermined range over an operating temperature range.

Japanese Unexamined Patent Application Publication No. 11-344344 discloses an angular velocity sensor in which a temperature-sensitive element, such as a thermistor, is used as a resistor included in a phase-shift circuit which includes a capacitor and the resistor. Here, the configuration of the angular velocity sensor disclosed in Japanese Unexamined Patent Application Publication No. 11-344344 will be described with reference to FIG. 1. Referring to FIG. 1, electrodes 5, 7, and 9 of a cylindrical piezoelectric vibrator 10 are connected to a reference potential. Detection electrodes 6 and 8 are connected to a differential amplifier 11 and a phase-shift circuit 14. The phase-shift circuit 14 is connected to a driving electrode 4 of the piezoelectric vibrator 10 via a driving oscillation circuit 15, whereby a self-oscillation loop is provided. Consequently, an alternating voltage of a frequency that is substantially the same as the resonant frequency of the piezoelectric vibrator 10 is applied to the driving electrode 4, and bending vibrations are therefore excited in the X direction. Since the detection electrodes 6 and 8 are symmetric with respect to the bending vibrations in the X direction, the outputs of the X directional component are canceled out by the differential amplifier 11.

The outputs of the detection electrodes 6 and 8 have opposite phases with respect to the bending vibrations caused by the Coriolis force. Accordingly, only the Y directional component, that is, an alternating voltage proportional to a rotational angular velocity, is output from the differential amplifier 11. The synchronous detection of the output of the differential amplifier 11 is performed by a synchronous detection circuit 12. The synchronous detection result is rectified by a low-pass filter 13. Consequently, a direct voltage proportional to the rotational angular velocity is output to an output terminal 16.

In the above-described circuit, a temperature-sensitive element 19 is provided as a resistance element included in an RC circuit of the phase-shift circuit 14.

However, such an angular velocity sensor disclosed in Japanese Unexamined Patent Application Publication No. 11-344344 in which a circuit constant of a phase-shift circuit included in an oscillation loop of a driving oscillation circuit of a piezoelectric vibrator is corrected using a temperature-sensitive element requires, for example, a temperature-sensitive chip resistor for temperature compensation. It is therefore necessary to provide space for the temperature-sensitive chip resistor in the angular velocity sensor. However, for example, in a compact angular velocity sensor having an area substantially equal to or less than an area of about 4 mm×about 4 mm, the space for such a chip component is not available. In spite of its limited space, if the chip component is provided in the angular velocity sensor, the chip component must be surface mounted. In this case, the productivity of the angular velocity sensor is significantly decreased.

SUMMARY OF THE INVENTION

To overcome the problems described above, preferred embodiments of the present invention provide an angular velocity sensor capable of achieving highly stable detection sensitivity of an angular velocity over an operating temperature range without using a temperature-sensitive element, such as a temperature-sensitive chip resistor, for example, and also provide a method of setting temperature characteristics of the angular velocity sensor.

A method of setting temperature characteristics of an angular velocity sensor according to preferred embodiments of the present invention is provided. The angular velocity sensor includes a piezoelectric vibrator, a driving circuit (an adding circuit, an amplitude control circuit, and a phase-shift circuit) arranged to drive the piezoelectric vibrator, the driving circuit and the piezoelectric vibrator defining an oscillation circuit, and a synchronous detection circuit arranged to perform, using a detection signal having a predetermined phase angle based on an oscillation period of the oscillation circuit, synchronous detection of a voltage signal caused by vibrations of the piezoelectric vibrator occurring due to the Coriolis force and to output an angular velocity detection signal that is a voltage signal based on the Coriolis force. The method according to a preferred embodiment of the present invention includes the steps of acquiring temperature characteristics of a detuning frequency that is a frequency difference between an oscillation frequency of the oscillation circuit and a frequency of the voltage signal (characteristics of a change in the detuning frequency with respect to a change in temperature), acquiring sensitivity characteristics of the detuning frequency (sensitivity to the detuning frequency), acquiring temperature characteristics of a detection phase that is a phase difference between a Coriolis signal phase that corresponds to a phase angle of the voltage signal and an oscillation signal phase of the oscillation circuit; acquiring sensitivity characteristics of the detection phase (sensitivity to the detection phase), acquiring detuning frequency sensitivity change characteristics that indicate how sensitivity to the detuning frequency is changed in accordance with the temperature using the temperature characteristics of the detuning frequency and the sensitivity characteristics of the detuning frequency, acquiring detection phase sensitivity change characteristics that indicate how sensitivity to the detection phase is changed in accordance with the temperature using the temperature characteristics of the detection phase and the sensitivity characteristics of the detection phase. and determining the detection phase so that the detuning frequency sensitivity change is controlled by the detection phase sensitivity change.

An angular velocity sensor according to a preferred embodiment of the present invention includes a piezoelectric vibrator, a driving circuit (an adding circuit, an amplitude control circuit, and a phase-shift circuit) arranged to drive the piezoelectric vibrator, the driving circuit and the piezoelectric vibrator defining an oscillation circuit, a synchronous detection circuit arranged to perform, using a detection signal having a predetermined phase angle based on an oscillation period of the oscillation circuit, synchronous detection of a voltage signal caused by vibrations of the piezoelectric vibrator occurring due to the Coriolis force and to output an angular velocity detection signal that is a voltage signal based on the Coriolis force, and a phase-shift circuit arranged to detect an oscillation signal synchronized with the oscillation period from the driving circuit, generate the detection signal by shifting a phase of the oscillation signal by the predetermined phase angle, and output the generated detection signal to the synchronous detection circuit.

The amount of phase shift of the phase-shift circuit is preferably determined so that a detuning frequency sensitivity change is controlled by a detection phase sensitivity change. The characteristics of the detuning frequency sensitivity change indicate how sensitivity to a detuning frequency is changed in accordance with the temperature. The detuning frequency is a frequency difference between an oscillation frequency of the oscillation circuit and a frequency of the voltage signal. The detuning frequency sensitivity change characteristics are acquired using temperature characteristics of the detuning frequency and sensitivity characteristics of the detuning frequency. The characteristics of the detection phase sensitivity change indicate how sensitivity to a detection phase is changed in accordance with the temperature. The detection phase is a phase difference between a Coriolis signal phase that corresponds to a phase angle of the voltage signal and an oscillation signal phase of the oscillation circuit. The detection phase sensitivity change characteristics are acquired using temperature characteristics of the detection phase and sensitivity characteristics of the detection phase.

According to a method of setting temperature characteristics of an angular velocity sensor according to preferred embodiments of the present invention, a detection phase sensitivity change occurs in accordance with the temperature. The detection phase sensitivity change is determined using the temperature characteristics of a detection phase and the sensitivity characteristics of the detection phase. The detection phase is a phase difference between a Coriolis signal phase that corresponds to a phase angle of a voltage signal and an oscillation signal phase of an oscillation circuit. A detuning frequency sensitivity change occurs in accordance with the temperature. The detuning frequency sensitivity change is determined using temperature characteristics of a detuning frequency and sensitivity characteristics of the detuning frequency and is controlled by the occurrence of the detection phase sensitivity change. Accordingly, sensitivity can be maintained substantially constant over a wide temperature range without using a temperature-sensitive element.

According to an angular velocity sensor according to preferred embodiments the present invention, a phase-shift circuit detects an oscillation signal synchronized with an oscillation period from a driving circuit. For this oscillation signal, a synchronizing signal whose phase has been shifted by a predetermined phase angle is output to a synchronous detection circuit. Thus, by controlling a detection phase, a sensitivity change with temperature can be determined without using a temperature-sensitive element.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 8 is a diagram illustrating the relationship between a detuning frequency and sensitivity.

FIGS. 13A to 13C are diagrams illustrating the relationships among a frame corresponding to a half cycle of a synchronous detection circuit, a Coriolis-force waveform that is changed in accordance with the temperature, and an output voltage of the synchronous detection circuit.

DETAILED DESCRIPTION OF PREFERRED EMBODIMENTS

An angular velocity sensor according to a preferred embodiment of the present invention and a method of setting temperature characteristics of the angular velocity sensor will be described with reference to the accompanying drawings.

Figure 1:
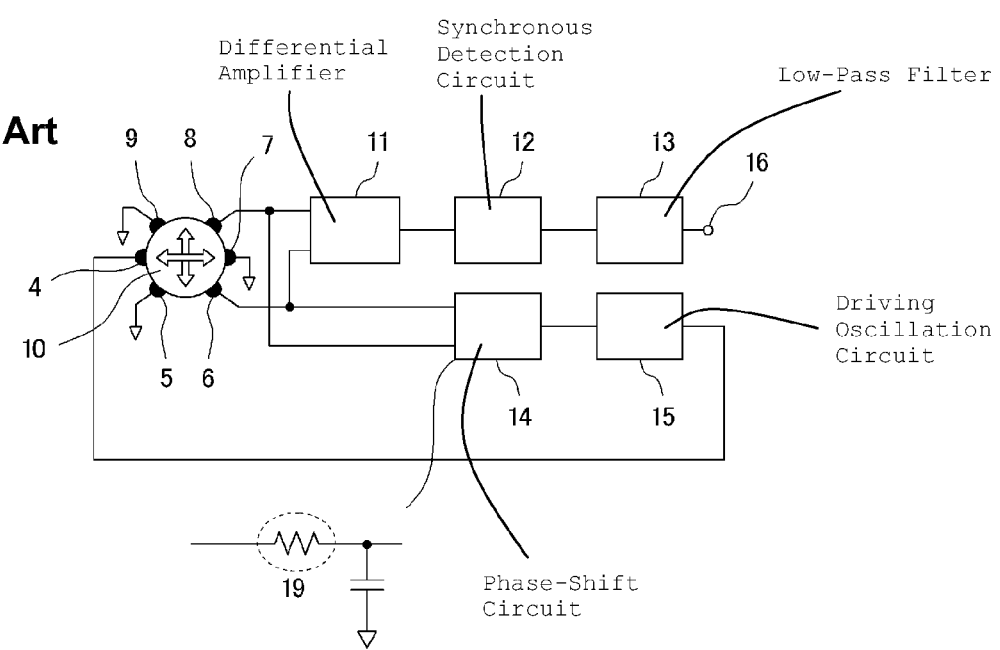
FIG. 1 is a diagram illustrating the configuration of an angular velocity sensor of the related art.
Figure 2:
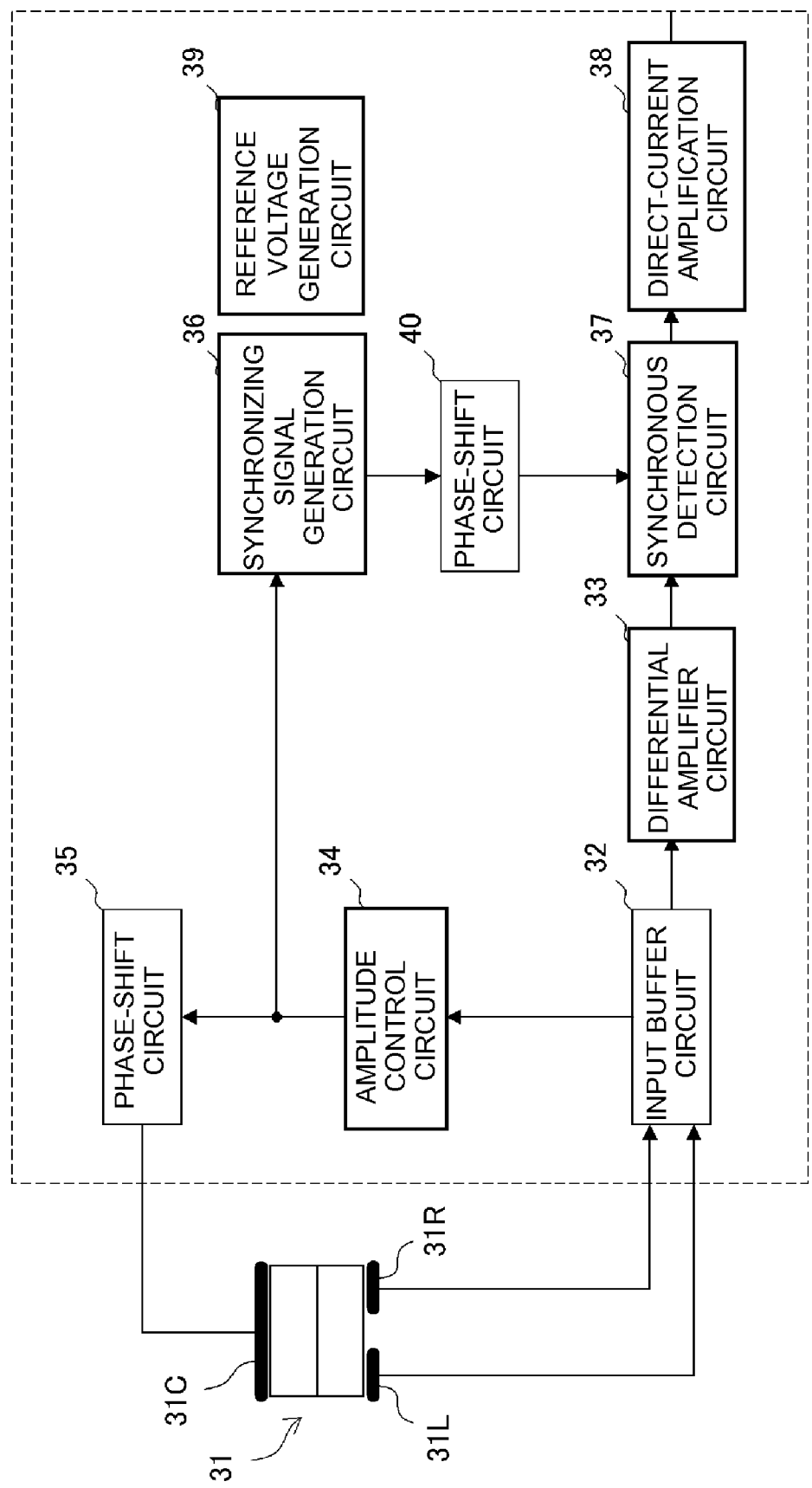
FIG. 2 is a block diagram illustrating the configuration of an angular velocity sensor according to a preferred embodiment of the present invention.

FIG. 2 is a block diagram illustrating the configuration of an angular velocity sensor including a tuning piezoelectric vibrator in which electrodes are provided on a prismatic piezoelectric substance. Referring to FIG. 2, a piezoelectric vibrator 31 is preferably a bimorph tuning piezoelectric vibrator, for example. The piezoelectric vibrator 31 includes a left electrode 31L, a right electrode 31R, and a common electrode 31C. A driving voltage is supplied between the left electrode 31L and the common electrode 31C and between the right electrode 31R and the common electrode 31C. Furthermore, the piezoelectric vibrator 31 obtains an L signal and an R signal from the left electrode 31L and the right electrode 31R, respectively, and supplies the obtained L and R signals to an input buffer circuit 32. Each of the L and R signals includes a voltage caused by vibrations of the piezoelectric vibrator occurring due to the Coriolis force. The input buffer circuit 32 includes an adding circuit arranged to add the L and R signals and output an L+R signal, and supplies the L+R signal to an amplitude control circuit 34. This combined signal is a stable feedback signal obtained by canceling the Coriolis force.

By supplying the above-described feedback signal to the amplitude control circuit 34, a driving voltage having a constant amplitude is generated. This driving voltage is supplied to the common electrode 31C of the piezoelectric vibrator 31 via a phase-shift circuit 35. The phase-shift circuit 35 is a circuit arranged to control the phase of the combined signal supplied from the input buffer circuit 32, and control the phase of the combined signal so that the difference between the phase of the combined signal and the phase of the driving voltage to be applied to the common electrode 31C enables stable oscillation at a desired frequency.

The piezoelectric vibrator 31, the input buffer circuit 32, the amplitude control circuit 34, and the phase-shift circuit 35 define an oscillation circuit. The input buffer circuit 32, the amplitude control circuit 34, and the phase-shift circuit 35 define a driving circuit arranged to drive the piezoelectric vibrator 31.

A synchronizing signal generation circuit 36 generates a rectangular-wave synchronizing signal based on an output signal of the amplitude control circuit 34. A phase-shift circuit 40 shifts the phase of the synchronizing signal by a predetermined amount, and supplies a phase-shifted signal to a synchronous detection circuit 37.

The synchronous detection circuit 37 performs detection of a signal output from a differential amplifier circuit 33 in synchronization with the synchronizing signal output from the differential amplifier circuit 33. The output voltage of the synchronous detection circuit 37 is a direct-current voltage that is approximately proportional to an angular velocity applied to the piezoelectric vibrator 31. A direct-current amplification circuit 38 performs direct-current amplification of the output voltage of the synchronous detection circuit 37, and outputs the result of the direct-current amplification as an angular velocity detection signal. A reference voltage generation circuit 39 externally outputs a reference voltage from this angular velocity sensor or inputs it to this angular velocity sensor.

Figure 3:
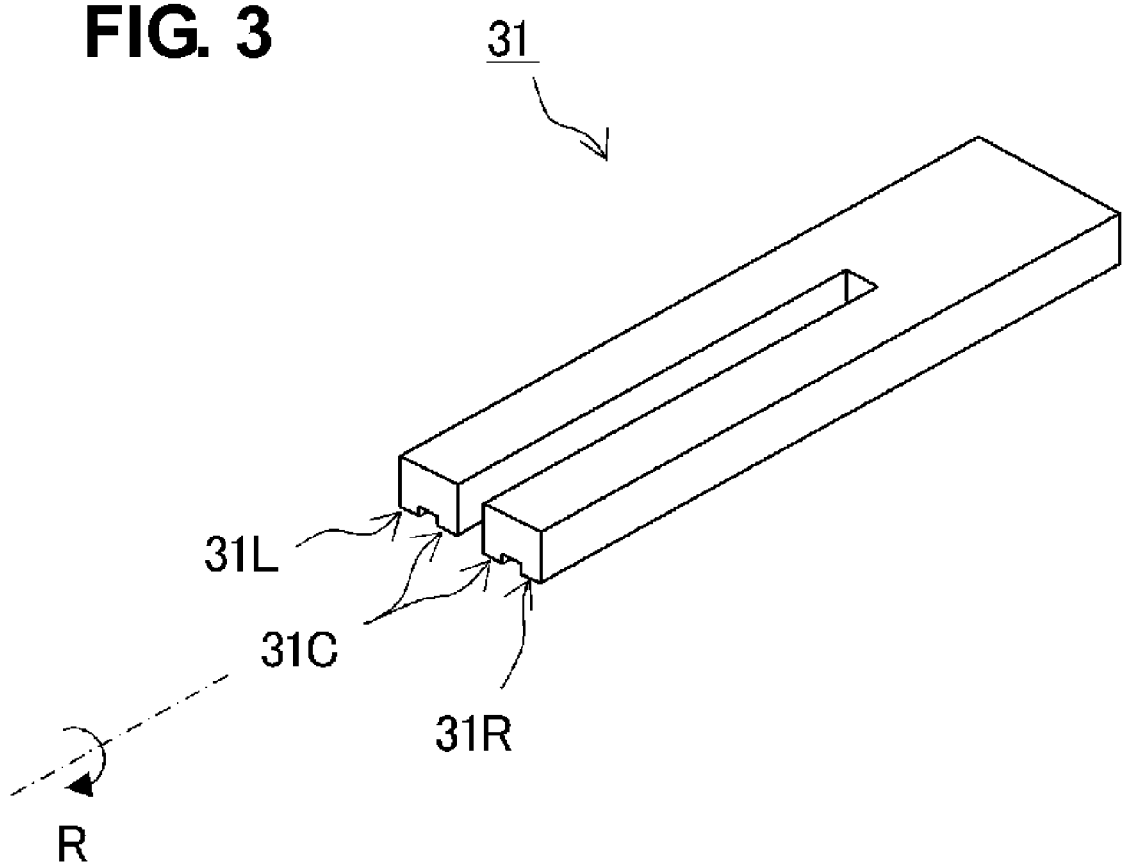
FIG. 3 is a perspective view illustrating the configuration of a piezoelectric vibrator used in the angular velocity sensor.

FIG. 3 is a perspective view illustrating the configuration of a tuning fork-type piezoelectric vibrator that is used as the piezoelectric vibrator 31. The piezoelectric vibrator 31 is a tuning fork-type piezoelectric vibrator that is configured such that polarization processing is performed on two piezoelectric substrates and these processed piezoelectric substrates are bonded together so that the polarization directions thereof are opposite to each other. Electrodes 31L, 31C, and 31R are provided on the bottom surface of each of a pair of legs of the piezoelectric vibrator 31 in the drawing. By applying a driving voltage between the electrode 31L and the electrode 31C and between the electrode 31R and the electrode 31C, the pair of legs of the piezoelectric vibrator 31 performs fundamental vibrations moving toward and away from each other substantially in the horizontal direction.

In the piezoelectric vibrator 31, if a rotational angular velocity is provided in the R direction as shown in FIG. 3, the pair of legs is caused to vibrate oppositely in the vertical direction in FIG. 3 due to the Coriolis force.

The piezoelectric vibrator 31 includes an interlayer metal film in the thickness direction thereof which is not connected to a circuit. Voltages having opposite polarities individually occur between the interlayer metal film and the electrode 31L and between the interlayer metal film and the electrode 31R in accordance with the Coriolis force. In the piezoelectric vibrator 31, a metal film may or may not be provided on the side of the other main surface opposite to the main surface on which the electrodes 31L, 31C, and 31R are provided.

Figure 4:
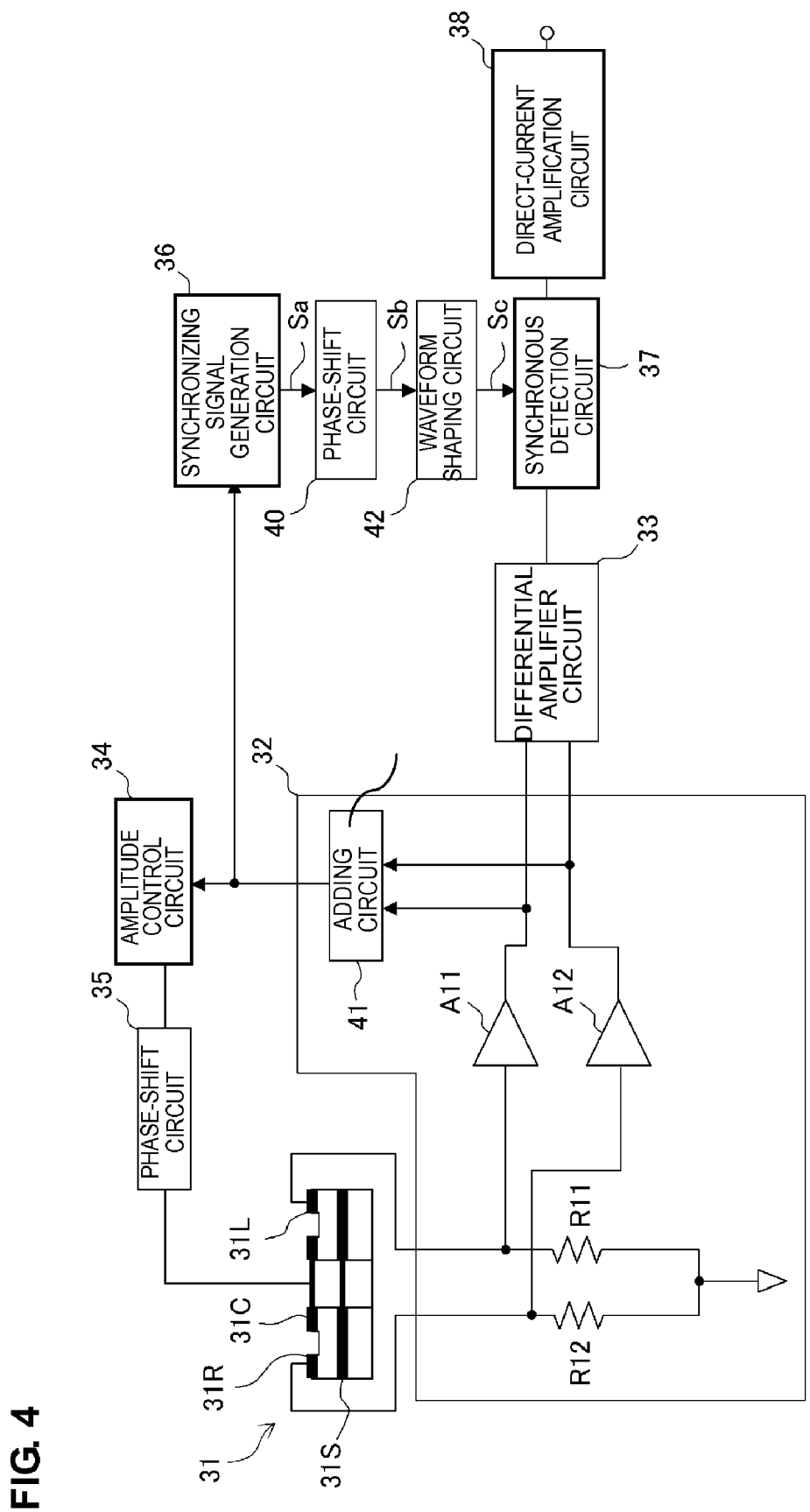
FIG. 4 is a circuit diagram illustrating the configuration of the angular velocity sensor according to a preferred embodiment of the present invention.

FIG. 4 is a diagram illustrating a circuit configuration of an example of the angular velocity sensor illustrated in FIG. 2. In the angular velocity sensor shown in FIG. 4, the connection relationship of the circuit is partially changed, as compared to the angular velocity sensor shown in FIG. 2. The piezoelectric vibrator 31 includes the electrodes 31L, 31C, and 31R and an interlayer metal film 31S.

Buffer circuits A11 and A12 receive voltages occurring in the electrodes 31L and 31R of the piezoelectric vibrator 31 with high-input impedances, respectively. A connection point between the resistors R11 and R12 is connected to a reference voltage point.

An adding circuit 41 adds the output voltages of the buffer circuits A11 and A12, and supplies the result of the addition to the amplitude control circuit 34. The phase-shift circuit 35 shifts the phase of a supplied voltage by a predetermined amount between the input and output terminals thereof. The piezoelectric vibrator 31 is driven by a voltage output from the phase-shift circuit 35.

The phase of a voltage to be applied between each of the electrodes 31R and 31L and the electrode 31C in the piezoelectric vibrator 31 is controlled by the phase-shift circuit 35 so that the piezoelectric vibrator 31 resonates. The amplitude of the voltage is controlled by the amplitude control circuit 34. Accordingly, the piezoelectric vibrator 31 continues to oscillate.

The synchronizing signal generation circuit 36 receives from the adding circuit 41 an L+R signal and makes the amplitude of the signal stable. The L+R signal is a signal that is obtained after the Coriolis forces have been canceled and is based on the oscillation period of the above-described oscillation circuit. The phase-shift circuit 40 shifts the phase of an output signal (a sinusoidal signal) of the synchronizing signal generation circuit 36 by a predetermined amount by controlling the time constant of the CR phase-shift circuit.

A waveform shaping circuit 42 converts the signal output from the phase-shift circuit 40 into a rectangular-wave signal required for synchronous detection. The synchronous detection circuit 37 performs detection of the signal output from the differential amplifier circuit 33 in synchronization with a signal output from the waveform shaping circuit 42.

Figure 5:
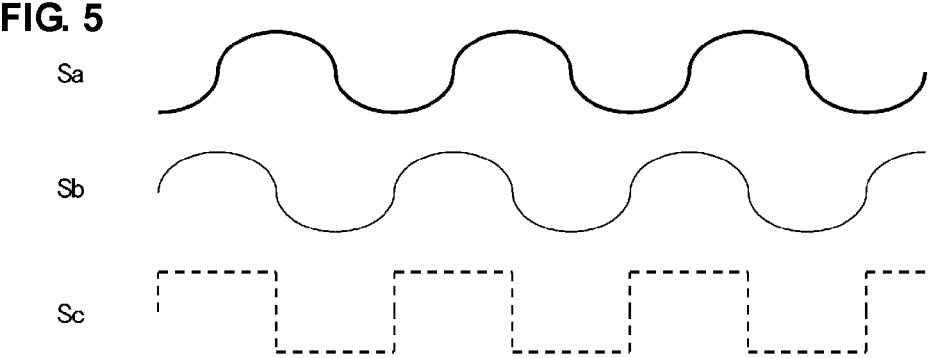
FIG. 5 is a waveform diagram of each of predetermined points in the angular velocity sensor illustrated in FIG. 4.

FIG. 5 is a waveform diagram of each of an output signal Sa of the synchronizing signal generation circuit 36, an output signal Sb of the phase-shift circuit 40, and an output signal Sc of the waveform shaping circuit 42. As illustrated in FIG. 5, the synchronizing signal generation circuit 36 outputs a sinusoidal signal. The phase-shift circuit 40 shifts the phase of the sinusoidal signal by a predetermined amount using the time constant of the CR phase-shift circuit. The waveform shaping circuit 42 converts the sinusoidal signal Sb into a rectangular-wave signal by binarizing the signal Sb using a predetermined threshold value, and supplies the rectangular-wave signal to the synchronous detection circuit 37.

Figure 6A:
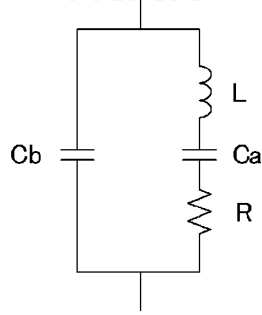
FIGS. 6A and 6B are equivalent circuit diagrams of each of a piezoelectric vibrator and a buffer circuit.
Figure 6B:
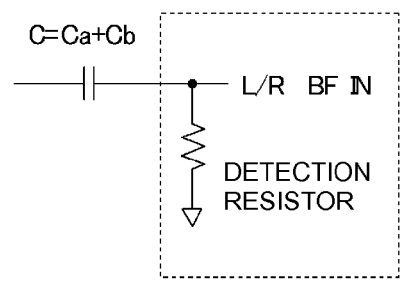

FIGS. 6A and 6B are equivalent circuit diagrams of each of the piezoelectric vibrator 31 and the buffer circuit A11 or A12 which are illustrated in FIG. 4. As illustrated in FIG. 6A, the equivalent circuit of the piezoelectric vibrator 31 includes capacitors Ca and Cb, a resistor R, and an inductor L. FIG. 6B illustrates the circuit configuration of an input portion of the buffer circuit A11 or A12. The input portion of each of the buffer circuits A11 and A12 includes a detection resistor. Furthermore, the piezoelectric vibrator 31 can be viewed as a detection capacitor (C=Ca+Cb) in its resonant state. Accordingly, the piezoelectric vibrator 31 and this detection resistor define a CR time constant circuit. The capacitance of the above-described detection capacitor C is changed in accordance with the temperature characteristics of a piezoelectric substance included in the piezoelectric vibrator 31. Accordingly, the phase of the output voltage (a voltage signal based on the Coriolis force) of each of the buffer circuits A11 and A12 is changed in accordance with the temperature, and an oscillation frequency is therefore changed in accordance with the temperature. Furthermore, the frequency of a voltage signal caused by the Coriolis force is changed in accordance with the change in the oscillation frequency.

Figure 7:
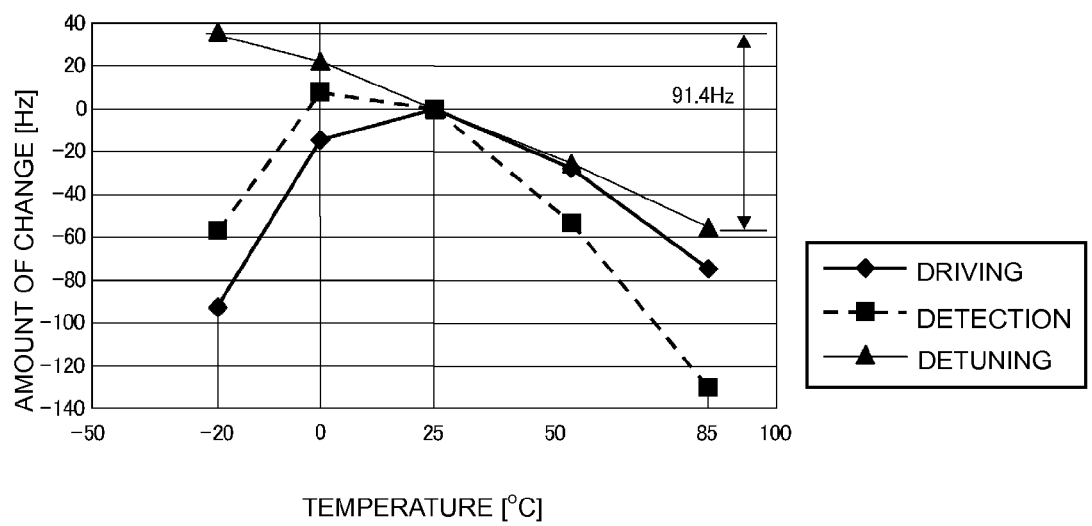
FIG. 7 is a diagram illustrating temperature characteristics of a detuning frequency.

FIG. 7 illustrates temperature characteristics of the following frequencies: the oscillation frequency of the oscillation circuit (the oscillation frequency is represented as a driving frequency in FIG. 7, because the oscillation frequency is also used to drive the piezoelectric vibrator); the frequency of a voltage signal (hereinafter referred to as a "detection signal") caused by the vibrations of the piezoelectric vibrator occurring due to the Coriolis force; and a detuning frequency that is a frequency difference between the oscillation frequency and the frequency of the detection signal.

Here, a reference temperature is preferably about 25° C., for example, the detuning frequency is preferably about 50 Hz, for example, at the reference temperature of about 25° C., and the value of the amount of change in the detuning frequency is preferably about 0 Hz, for example, at about 25° C. As the temperature increases or decreases from about 25° C., the driving frequency and the frequency of the detection signal decrease. In a temperature range above the reference temperature of about 25° C., the rate of change in the frequency of the detection signal is greater than that of the driving frequency. In a temperature range below the reference temperature of about 25° C., the rate of change in the driving frequency is greater than that of the frequency of the detection signal. Accordingly, the detuning frequency is substantially linearly changed within a range of about +35 Hz to about −56 Hz (approximately 91 Hz) from the detuning frequency at about 25° C. with temperature changes (in this example, within the temperature range of about −20° C. to about +85° C.).

FIG. 8 illustrates the characteristics of the sensitivity of a piezoelectric vibrator to a detuning frequency when the detuning frequency is preferably set to about 50 Hz, for example, at a reference temperature of about 25° C. As illustrated in FIG. 8, the sensitivity is relatively high in the vicinity of a detuning frequency of about 0 Hz (i.e., as the detection frequency and the driving frequency approach each other, the sensitivity increases). As the detuning frequency increases (i.e., as the difference between the detection frequency and the driving frequency increases), the sensitivity decreases. In this example, at a detuning frequency of about −19 Hz, the maximum sensitivity can be obtained. When the detuning frequency is about +90 Hz, the value of the sensitivity is about 0.2. On the other hand, when the detuning frequency is about 0 Hz, the value of the sensitivity is about 0.8. Thus, the sensitivity increases in value by a factor of approximately 4.

As described previously, as illustrated in FIG. 7, as the temperature decreases, the value of the detuning frequency positively increases. At that time, as illustrated in FIG. 8, the sensitivity decreases. Conversely, as the temperature increases, the sensitivity increases.

Figures 9A, 9B, 9C:
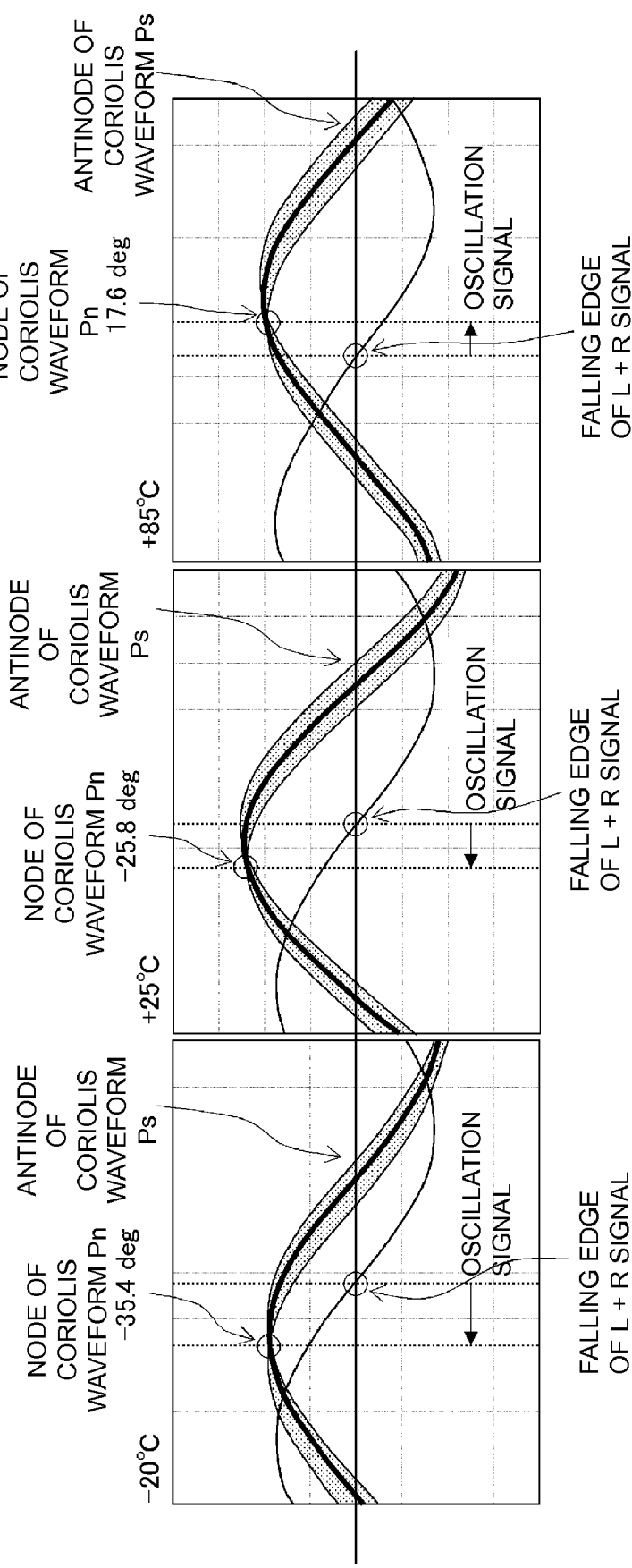
FIGS. 9A to 9C are diagrams illustrating temperature characteristics of a detection phase.

FIGS. 9A to 9C illustrate temperature characteristics of a detection phase obtained when the piezoelectric vibrator 31 is connected to an evaluation circuit. In FIGS. 9A to 9C, half-tone dot meshing areas denotes the range of variation of the output signal of the differential amplifier circuit 33 (hereinafter referred to as a "Coriolis waveform, because this output signal is used to detect the Coriolis force) which is obtained by the measurement for ten seconds when an angular velocity is applied to the piezoelectric vibrator 31.

Thus, when the amplitude of the Coriolis waveform is changed in accordance with the change in the Coriolis force, a node Pn and an antinode Ps appear in the Coriolis waveform. The locations of the node and the antinode are determined based on the phase of an oscillation loop of the above-described oscillation circuit and the detuning frequency of the piezoelectric vibrator.

In FIGS. 9A to 9C, an "oscillation signal" is the output signal (L+R signal) of the adding circuit 41 illustrated in FIG. 4. The phase difference between the zero crossing point on the falling edge of this oscillation signal and the node of the Coriolis waveform is the "detection phase".

As illustrated in FIGS. 9A, 9B, and 9C, at a low temperature of about −20° C., the detection phase is about −35.4°. At a temperature of about +25° C., the detection phase is about −25.8°. At a high temperature of about +85° C., the detection phase is about +17.6°. Thus, as the temperature increases, the absolute value of the detection phase decreases. When the temperature exceeds a certain temperature, the detection phase becomes a positive value. Although not illustrated in FIGS. 9A to 9C, in the vicinity of a temperature of about +55° C., the detection phase becomes about 0°.

The synchronous detection circuit 37 calculates an integration value of the Coriolis waveform in a single cycle of the oscillation period starting from the zero crossing point on the falling edge of the above-described oscillation signal as a detection output signal. More specifically, the synchronous detection circuit 37 adds an absolute value of an integration value of a negative half wave to an integration value of a positive half wave. Alternatively, the synchronous detection circuit 37 calculates an integration value of the Coriolis waveform in a half cycle of the oscillation period starting from the zero crossing point on the falling edge of the oscillation signal as a detection output signal.

Figure 10:
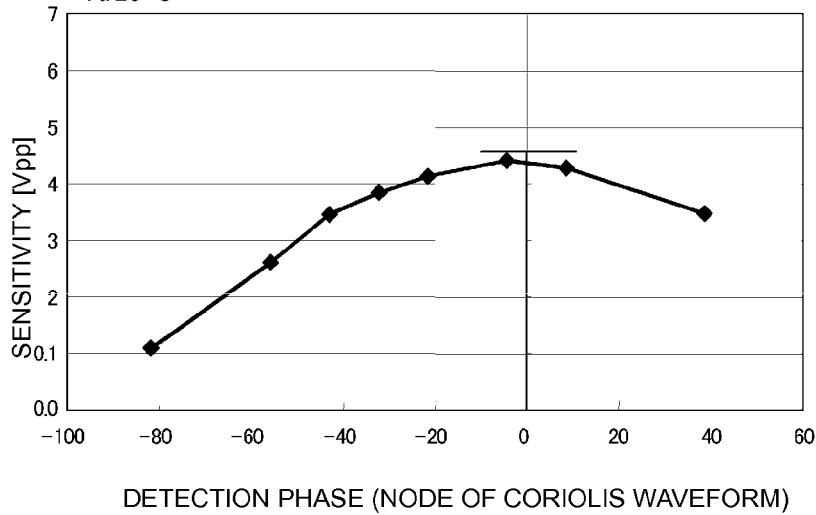
FIG. 10 is a diagram illustrating the relationship between a detection phase and sensitivity.

FIG. 10 illustrates a relationship between the above-described detection phase and the sensitivity (detection efficiency) at about 25° C. When the detection phase is about 0° C., the detection signal matches the node of the Coriolis waveform and the maximum sensitivity can therefore be obtained. That is, the maximum amount of change in the output voltage of the synchronous detection circuit 37, which is caused by the change in the magnitude of the Coriolis force, is obtained. In this preferred embodiment of the present invention in which a bimorph tuning fork-type piezoelectric vibrator is used, as illustrated in FIG. 9, the value of the temperature change of the detection phase is about −35.4° at about −20° C. and is about 0° in the vicinity of about +55° C. Accordingly, the sensitivity characteristic value, which is changed in accordance with the change in the detection phase caused by a temperature change, is a low value at a low temperature, and is the maximum value in the vicinity of about +55° C.

Consequently, for both of the temperature characteristics of the detuning frequency and the temperature characteristics of the detection phase, the sensitivity is low at a low temperature and increases with increasing temperature.

Thus, when the value of the detection phase is about 0°, the maximum sensitivity is obtained. As the amount of phase shift of the detection phase increases, the sensitivity decreases.

Using the fact that the detection phase is changed in accordance with the temperature, the detection phase is determined so that the change in sensitivity is properly corrected. The change in sensitivity is caused by the change in the detuning frequency. The change in the detuning frequency is caused by the change in temperature.

Figure 11A:
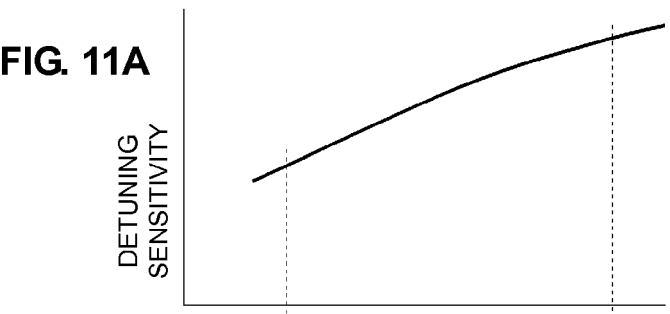
FIGS. 11A to 11C are diagrams illustrating the changes in sensitivity characteristics caused by the phase of a synchronous detection and a phase shift, and temperature characteristics of overall sensitivity.
Figure 11B:
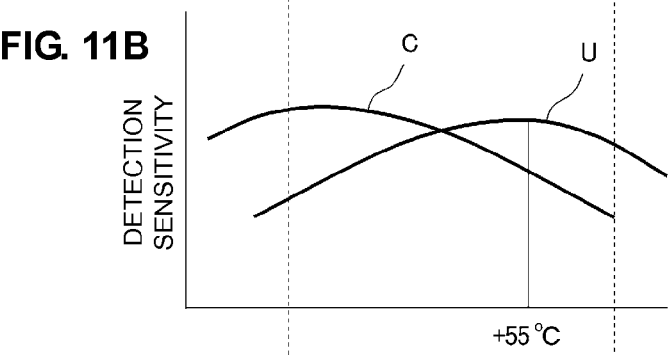
Figure 11C:
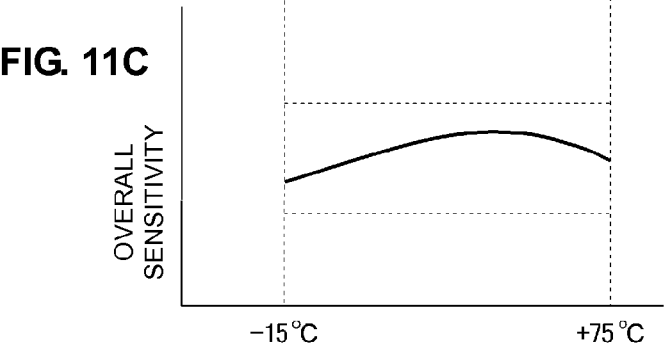

FIGS. 11A to 11C are diagrams describing the above-described correction. FIG. 11A illustrates characteristics of the sensitivity change caused by the change in the detuning frequency. The change in the detuning frequency is caused by the change in temperature. FIG. 11B illustrates characteristics of the sensitivity change caused by the change in the detection phase. The change in the detection phase is caused by the change in temperature. A curve U denotes characteristics of the sensitivity change when detection is performed using a phase synchronized with the detection signal (L+R signal). A curve C denotes characteristics of the sensitivity change when the amount of phase shift performed by the phase-shift circuit 40 illustrated in FIG. 4 is determined and the peak of the detection sensitivity with respect to the temperature change is shifted. FIG. 11C illustrates the overall sensitivity characteristics obtained by mixing the characteristics illustrated in FIG. 11A and the characteristics indicated by the curve C illustrated in FIG. 11B. The change in sensitivity caused by a phenomenon in which the detuning frequency is changed in accordance with the temperature is described by an upward-sloping curve. On the other hand, the corrected detection sensitivity with respect to the temperature change is described by a downward-sloping curve. Accordingly, the overall sensitivity can have substantially flat characteristics over a wide temperature range, and can fall within a standardized sensitivity range.

Figure 12:
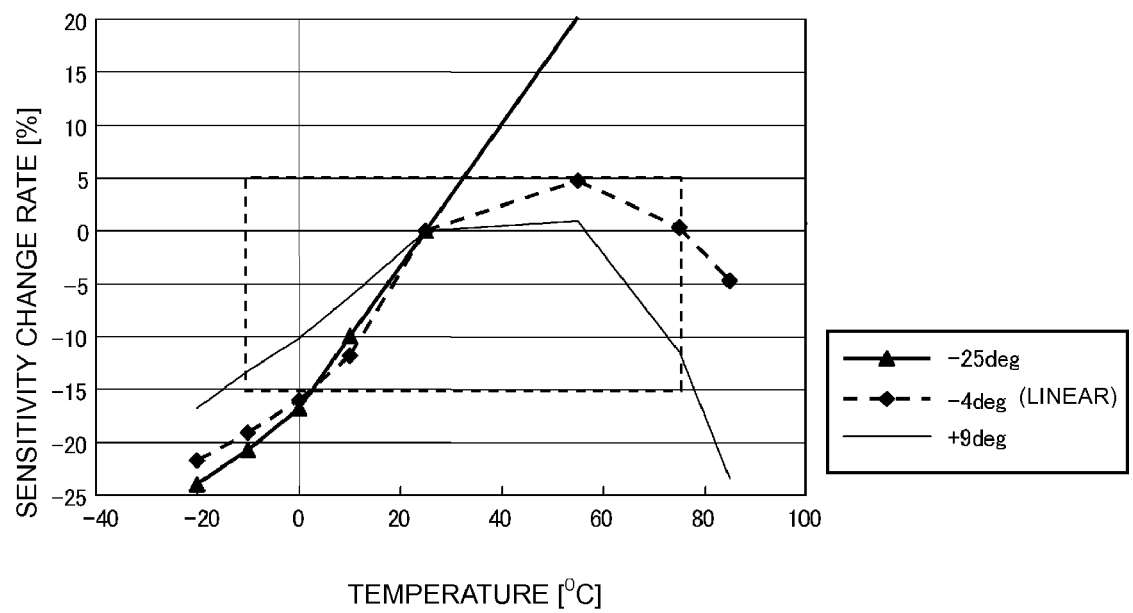
FIG. 12 is a diagram illustrating the changes in sensitivity characteristics caused by the phase of synchronous detection and a phase shift.

FIG. 12 illustrates the change in the sensitivity characteristics when the phase shift is performed by the phase-shift circuit 40 for synchronous detection. If the phase shift is not performed (as illustrated in FIG. 9B, the value of the detection phase is about −25.8° at about 25° C.), the temperature range with respect to the sensitivity change rate of about −15% to about +5% is a narrow range of about 0° C. to about 30° C. However, if the amount of phase shift performed by the phase-shift circuit 40 is set to about +21° so that the value of the detection phase is about −4°, the temperature range with respect to the above-described sensitivity change rate can be extended over a wide temperature range of about 0° C. to at least about +75°. Furthermore, if the amount of phase shift is set to about +34° so that the value of the detection phase is about +9°, the temperature range with respect to the above-described sensitivity change rate can be extended over a wide temperature range of about −15° C. to about +75° C. and the range of the sensitivity change rate can also be narrowed.

FIGS. 13A to 13C are diagram illustrating a state in which synchronous detection is performed in accordance with the temperature change after the above-described amount of phase shift has been optimized. Here, an exemplary case in which the synchronous detection of a half cycle of the detection signal is performed is illustrated. A dotted line indicates a rectangular wave output from the waveform shaping circuit 42 illustrated in FIG. 4. A sinusoidal waveform indicates the Coriolis waveform (i.e., the waveform of a signal output from the differential amplifier circuit 33 illustrated in FIG. 4, that is, the waveform of a signal to be input into the synchronous detection circuit 37). Accordingly, integration is performed upon the sinusoidal wave in the half cycle indicated by the dotted line (i.e., a frame that will undergo synchronous detection). However, the equivalent positive and negative areas on the opposite sides of a border of the reference voltage cancel each other out. Accordingly, a voltage proportional to the remaining shaded area is output from the synchronous detection circuit 37.

FIGS. 13A, 13B, and 13C illustrate a low-temperature state, an ordinary-temperature state, and a high-temperature state, respectively. In the low-temperature state, synchronous detection is performed on the half cycle of a sinusoidal wave having the Coriolis waveform. In this case, as the temperature increases, the detuning frequencies are close to each other. The amplitude of the Coriolis waveform is therefore increased. However, since the phase of the Coriolis waveform is shifted in the above-described frame, the above-described cancellation area is increased and the shaded area is therefore maintained substantially constant. Thus, over a wide temperature range, a high-precision voltage based on the Coriolis force is output from the synchronous detection circuit 37.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method of setting temperature characteristics of an angular velocity sensor including a piezoelectric vibrator, a driving circuit arranged to drive the piezoelectric vibrator, the driving circuit and the piezoelectric vibrator defining an oscillation circuit, and a synchronous detection circuit arranged to perform synchronous detection of a voltage signal caused by vibrations of the piezoelectric vibrator arising from the Coriolis force using a detection signal having a predetermined phase angle based on an oscillation period of the oscillation circuit and output an angular velocity detection signal defined by a voltage signal based on the Coriolis force, the method comprising:
   acquiring temperature characteristics of a detuning frequency that is a frequency difference between an oscillation frequency of the oscillation circuit and a frequency of the voltage signal;
   acquiring sensitivity characteristics of the detuning frequency;
   acquiring temperature characteristics of a detection phase that is a phase difference between a Coriolis signal phase that corresponds to a phase angle of the voltage signal and an oscillation signal phase of the oscillation circuit;
   acquiring sensitivity characteristics of the detection phase;
   acquiring detuning frequency sensitivity change characteristics that indicate how the sensitivity to the detuning frequency changes in accordance with temperature using the temperature characteristics of the detuning frequency and the sensitivity characteristics of the detuning frequency;
   acquiring detection phase sensitivity change characteristics that indicate how the sensitivity to the detection phase changes in accordance with the temperature using the temperature characteristics of the detection phase and the sensitivity characteristics of the detection phase; and
   setting the detection phase so that the detuning frequency sensitivity change is controlled by the detection phase sensitivity change.

2. An angular velocity sensor comprising:
   a piezoelectric vibrator;

a driving circuit arranged to drive the piezoelectric vibrator, the driving circuit and the piezoelectric vibrator defining an oscillation circuit;

a synchronous detection circuit arranged to perform synchronous detection of a voltage signal caused by vibrations of the piezoelectric vibrator arising from the Coriolis force using a detection signal having a predetermined phase angle based on an oscillation period of the oscillation circuit and output an angular velocity detection signal that is a voltage signal based on the Coriolis force; and a phase-shift circuit arranged to receive an oscillation signal synchronized with the oscillation period from the driving circuit, generate the detection signal by shifting a phase of the oscillation signal by the predetermined phase angle, and output the generated detection signal to the synchronous detection circuit; wherein the phase-shift circuit is arranged to determine an amount of phase shift so that a detuning frequency sensitivity change is controlled by a detection phase sensitivity change under characteristics of the detuning frequency sensitivity change indicating how sensitivity to a detuninq frequency changes in accordance with temperature;

the detuning frequency is a frequency difference between an oscillation frequency of the oscillation circuit and a frequency of the voltage signal;

the phase-shift circuit is arranged to acquire the detuning frequency sensitivity change characteristics using temperature characteristics of the detuninq frequency and sensitivity characteristics of the detuning frequency, and under characteristics of the detection phase sensitivity change indicating how sensitivity to a detection phase is changed in accordance with the temperature;

the detection phase is a phase difference between a Coriolis signal phase that corresponds to a phase angle of the voltage signal and an oscillation signal phase of the oscillation circuit; and the phase-shift circuit is arranged to acquire the detection phase sensitivity change characteristics using temperature characteristics of the detection phase and sensitivity characteristics of the detection phase.

* * * * *